Patented Dec. 12, 1922.

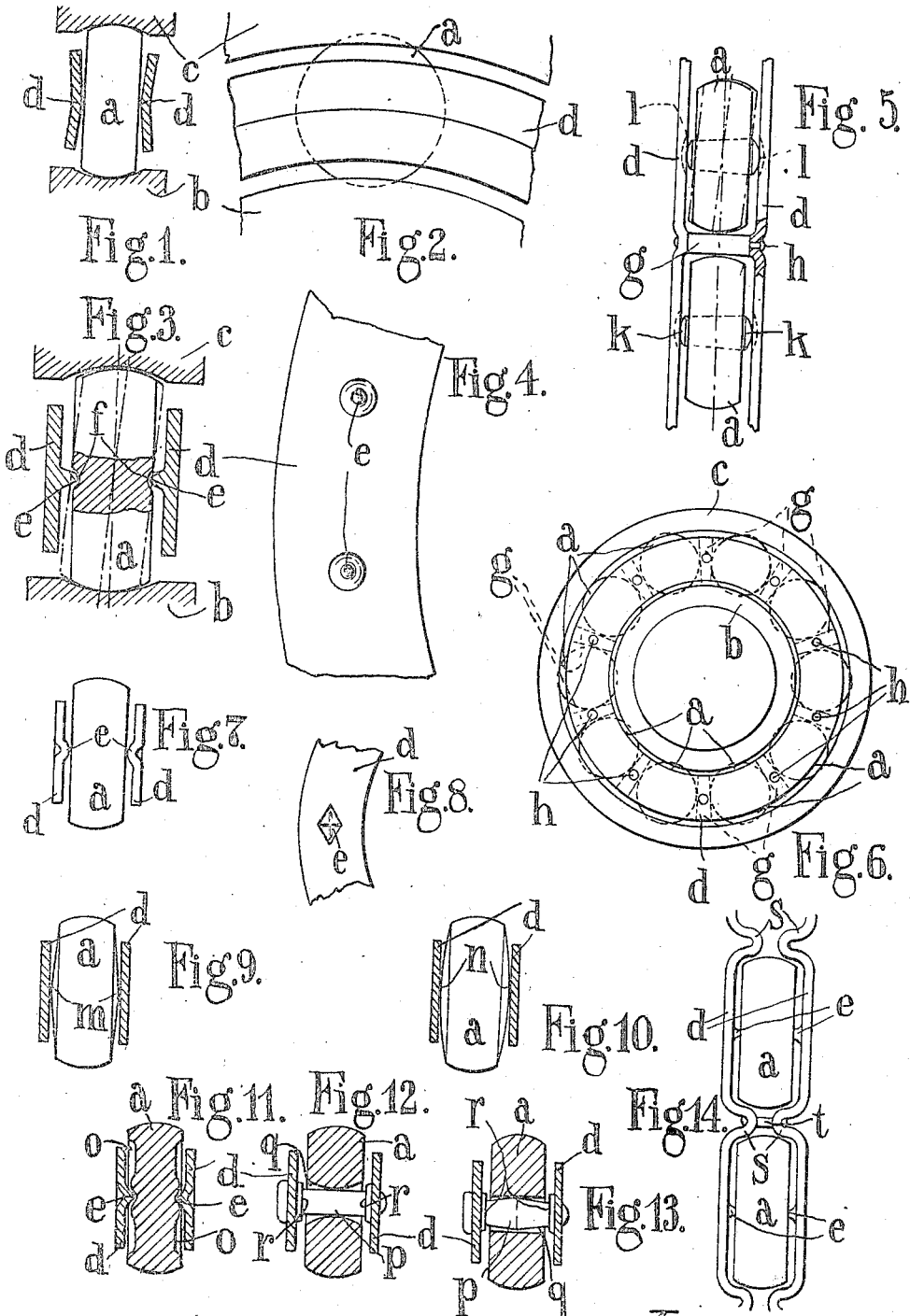

1,438,654

UNITED STATES PATENT OFFICE.

KARL OSKAR LEON, OF GOTTENBORG, SWEDEN.

ROLLER BEARING OR THE CAGE THEREOF.

Application filed June 14, 1921. Serial No. 477,462.

*To all whom it may concern:*

Be it known that I, KARL OSKAR LEON, a subject of the King of Sweden, and residing at 14, Vadmansgatan, Gottenborg, Sweden, have invented certain new and useful Improvements in and Relating to Roller Bearings or the Cages Thereof, of which the following is a specification.

This invention relates to roller bearings or the cages thereof, that are adapted to rotatively support the various rollers.

The present invention consists in a roller bearing having a cage for the rollers, in which the arrangement is such that each roller is prevented from having any substantial axial displacement of its centre, while the central axis of the roller is free to be angularly displaced so as no longer to be in a common plane with the central axis of the whole bearing. Thus the rollers are allowed a freedom of movement to adjust themselves to the raceways.

The invention will now be described with reference to the accompanying drawings, in which Figures 1 and 2 are a cross section and side elevation respectively of a roller bearing cage ring as hitherto constructed.

Figure 3 is a view similar to Figure 1 and illustrating the present invention applied to the cage rings.

Figure 4 is an enlarged side view of a portion of one of the cage rings.

Figure 5 is a plan view of part of the cage ring showing two rollers.

Figure 6 is a side elevation of the roller bearing complete.

Figures 7 to 13 show various modifications, and

Figure 14 is a view similar to Figure 5 of a modified shape of cage ring.

Referring to Figures 1 and 2, the rollers such as $a$ having the usual convex peripheries are arranged in the usual way, between the inner and outer concave raceways $b$, $c$, and maintained in running position between rings $d$ that are attached together at intervals to form a complete cage. In cross section the rings $d$ are ridge-like in form and oppose one another on opposite sides of the roller. The roller thus has a limited amount of movement in one plane limited by the sloping parts of the rings, but movement in any other plane is more or less limited by the line of the ridge, according to the plane of the turning movement.

In carrying the present invention into effect, and referring to Figure 3, each cage ring $d$ is fitted with a series of inwardly facing protuberances $e$ that may be of conical or pyramidal form, and which engage or register with a central depression $f$ in each end of the roller $a$. The depression is such as to allow the roller the necessary amount of play so that it will adjust itself in any plane; for example, it is allowed to move into the dotted position, Figure 3, or into that shown in dotted lines, Figure 5, the corresponding displacements involved being at right angles to each other. Preferably the tip of the projections $e$, as shown in full lines Figure 3, do not actually contact with the bottom of the depression $f$.

The cage rings $d$ may be of any suitable form, and are kept apart by distance pieces as $g$, through which connecting rivets or bolts $h$ may pass, Figure 5, the complete system being shown in Figure 6.

In Figure 5 instead of using projections $e$ on the cage rings, the converse arrangement is adopted of forming the rollers with axles or pins $k$ having convex ends which ride against the inner faces of the cage rings. These faces may be slightly recessed if necessary as at $l$, such recesses being large enough to allow the necessary play. Figure 7 shows a form in which the protuberances $e$ are stamped in the cage rings and are of nipple form, and Figure 8 shows a plan view of a protuberance $e$ which is pyramidal in shape. In Figure 7 the end faces of the roller are not recessed. In Figures 9 and 10, instead of the projecting pins $k$ the ends of the rollers $a$ are made conical as at $m$ or convex as at $n$ having the equivalent result of keeping the rollers in position, but at the same time allowing them the necessary play.

In Figure 11 the ends of the rollers are shown recessed at $o$ to bring the cage rings closer together.

Referring to Figures 12 and 13, the cage rings are fastened to one another by bolts $p$ which pass through holes $q$, the bolts taking the place of the distance pieces $g$, Figure 5. To allow the rollers the necessary play, the holes $q$, Figure 12, are made with flaring ends, whilst in Figure 13 the hole is cylindrical but the bolt $p$ is thickened at the centre. In both of these modifications the cage rings $d$ are thickened as at $r$ to allow of holes being formed to take the bolts $p$.

In Figure 14, the cage rings $d$ are formed of bent strip formed with stamped protuberances e to engage the rollers as already described, the rollers being kept apart by incurved parts s of the rings d kept together by the rivets t.

By the foregoing constructions a roller bearing is obtained in which the rollers are afforded full play in all directions to adjust themselves to the races, or to allow for any movement of the races whilst the bearing is working.

Having now described my invention, what I claim as new and desire to secure by Letters Patent is:—

1. A roller bearing comprising in combination, inner and outer raceways, rollers therebetween, a cage ring at each end of the various rollers, and means whereby each roller is prevented from having any substantial axial displacement of its centre, while the central axis of the roller is free to make a double conical movement about its centre, i. e., the apexes of the cones are approximately at the centre of the roller.

2. A roller bearing comprising in combination, inner and outer raceways, rollers therebetween whose peripheral surface is convex, a cage ring at each end of the various rollers, and means whereby each roller is prevented from having any substantial axial displacement of its centre, while the central axis of the roller is free to make a double conical movement about its centre, i. e., the apexes of the cones are approximately at the centre of the roller.

3. A roller bearing comprising in combination, inner and outer raceways, rollers therebetween whose axial length is less than their diameter, a cage ring at each end of the various rollers, and means whereby each roller is prevented from having any substantial axial displacement of its centre, while the central axis of the roller is free to be angularly displaced so as no longer to be in a common plane with the central axis of the whole bearing.

4. A roller bearing comprising in combination, inner and outer raceways, rollers therebetween, a cage ring at each end of the various rollers, and means whereby each roller is prevented from having any substantial axial displacement of its centre, while the central axis of the roller is free to be angularly displaced within pre-determined limits in every direction.

5. A roller bearing comprising in combination, inner and outer raceways, rollers therebetween, a cage ring at each end of the various rollers, and means whereby each roller is prevented from having any substantial axial displacement of its centre, while the central axis of the roller is free to oscillate in every direction within fixed limits.

6. A roller bearing comprising in combination, inner and outer raceways, rollers therebetween, a cage ring at each end of the various rollers, distance pieces between the rollers and connecting the cage rings together, and means whereby each roller is prevented from having any substantial axial displacement of its centre, while the central axis of the roller is free to be angularly displaced so as no longer to be in a common plane with the central axis of the whole bearing.

7. A roller bearing comprising in combination, inner and outer raceways, rollers therebetween, a cage ring at each end of the various rollers, and means whereby the centre part of the end of each roller is prevented from making any substantial axial displacement, while said centre part is free to move in every direction at right angles to the axis.

8. A roller bearing comprising in combination, inner and outer raceways, having inwardly facing concave bearing surfaces, disc rollers mounted therebetween having recessed centres and with convex peripheral surfaces, a cage ring at each end of the various rollers, and protuberances on the inner sides of the rings so shaped in relation to the recessed centres of the rollers as to prevent any substantial axial displacement of the said recessed centres, but to permit displacements of the same in every direction at right angles to the axis.

9. A roller bearing comprising in combination, inner and outer raceways having inwardly facing concave bearing surfaces, disc rollers mounted therebetween and having recessed centres on their end surfaces, convex peripheral surfaces to the rollers, cage rings arranged at the respective ends of the rollers, distance pieces between the rollers carried by the cage rings, and protuberances on the inner sides of the rings so shaped in relation to the recessed centres of the rollers as to prevent any substantial axial displacement of the said recessed centres but to permit displacements of the same in every direction at right angles to the axis.

10. A roller bearing as claimed in claim 9, in which the protuberances are not quite in contact with the central recesses, so that a very limited amount of axial play is possible, the displacements of the recessed centres at right angles to the axis being relatively large.

In testimony whereof I have signed my name to this specification.

KARL OSKAR LEON.